(12) United States Patent
Patel et al.

(10) Patent No.: US 12,341,645 B2
(45) Date of Patent: Jun. 24, 2025

(54) SYSTEMS AND METHODS FOR PRIORITIZING ALERTS

(71) Applicant: Capital One Services, LLC, McLean, VA (US)

(72) Inventors: Milind Patel, Frisco, TX (US); Yar Savchenko, Frisco, TX (US); Nikitha Kondapally, Frisco, TX (US); Adonis Moore, Midlothian, VA (US); Kevin Nguyen, Grand Prairie, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 338 days.

(21) Appl. No.: 17/404,375

(22) Filed: Aug. 17, 2021

(65) Prior Publication Data
US 2023/0054815 A1    Feb. 23, 2023

(51) Int. Cl.
| H04L 41/0686 | (2022.01) |
| G06N 20/00 | (2019.01) |
| H04L 41/0604 | (2022.01) |
| H04L 41/0631 | (2022.01) |
| H04L 41/069 | (2022.01) |
| H04L 41/16 | (2022.01) |

(52) U.S. Cl.
CPC ......... *H04L 41/0604* (2013.01); *G06N 20/00* (2019.01); *H04L 41/0631* (2013.01); *H04L 41/0686* (2013.01); *H04L 41/069* (2013.01); *H04L 41/16* (2013.01)

(58) Field of Classification Search
None
See application file for complete search history.

(56) References Cited

U.S. PATENT DOCUMENTS

| 6,351,656 | B1 * | 2/2002 | Burgan | G08B 5/227 |
| | | | | 455/566 |
| 9,632,904 | B1 * | 4/2017 | Erikson | G06Q 10/101 |
| 9,817,869 | B2 | 11/2017 | Aradhye et al. | |
| 10,506,055 | B2 | 12/2019 | Foged et al. | |
| 10,516,644 | B2 | 12/2019 | Shi et al. | |
| 10,769,548 | B2 | 9/2020 | Ilic et al. | |
| 10,873,596 | B1 * | 12/2020 | Bourget | H04L 51/02 |
| 11,348,448 | B1 * | 5/2022 | Adams | G08B 5/22 |
| 2002/0087649 | A1 * | 7/2002 | Horvitz | H04L 51/00 |
| | | | | 709/207 |

(Continued)

FOREIGN PATENT DOCUMENTS

WO    WO-2013152190 A1 * 10/2013 .......... G06F 11/0742

*Primary Examiner* — Sandarva Khanal
(74) *Attorney, Agent, or Firm* — TROUTMAN PEPPER LOCKE LLP; Christopher J. Forstner; John A. Morrissett

(57) ABSTRACT

The system may include one or more processors and memory that may store instructions that are configured to cause the system to perform a method. For example, the system may receive a first alert from a first application and determine, using a machine learning model, whether the first alert is similar to a previous alert. The determination may be based on the second alert satisfying a predetermined similarity threshold. When the first alert is similar to the previous alert, the system may associate a previous rating label with the first alert, the previous rating label being asssociated with the previous alert and transmit the first alert with the previous rating label to one or more user devices for display.

19 Claims, 6 Drawing Sheets

(56) References Cited

U.S. PATENT DOCUMENTS

| | | | |
|---|---|---|---|
| 2008/0205602 A1* | 8/2008 | Bishop | G06Q 10/107 379/88.12 |
| 2010/0257412 A1* | 10/2010 | Acuna | G06F 11/0727 714/E11.03 |
| 2014/0074532 A1* | 3/2014 | Mizuno | G06Q 10/1093 705/7.18 |
| 2015/0163321 A1* | 6/2015 | Abou Mahmoud | H04L 51/04 715/752 |
| 2017/0279602 A1* | 9/2017 | Pham | H04L 63/0442 |
| 2018/0373578 A1* | 12/2018 | Bridges | G06F 11/3604 |
| 2019/0052641 A1* | 2/2019 | Byrne | H04L 63/104 |
| 2019/0102469 A1* | 4/2019 | Makovsky | G06F 11/0781 |
| 2019/0379625 A1* | 12/2019 | Coffey | H04L 51/18 |
| 2019/0379700 A1* | 12/2019 | Canzanese, Jr. | G06F 16/9024 |
| 2020/0004980 A1* | 1/2020 | Blass | G06F 16/285 |
| 2020/0310889 A1* | 10/2020 | Levin | H04L 63/0263 |
| 2020/0314118 A1* | 10/2020 | Levin | H04L 63/1425 |
| 2020/0320845 A1* | 10/2020 | Livny | G06F 21/566 |
| 2021/0157704 A1* | 5/2021 | Parthasarathy | G06F 11/3065 |
| 2021/0295183 A1* | 9/2021 | Joy | G06N 20/00 |
| 2022/0245014 A1* | 8/2022 | Gupta | G06F 11/0781 |
| 2023/0362691 A1* | 11/2023 | Nakarmi | H04L 63/1433 |

* cited by examiner

SYSTEMS AND METHODS FOR PRIORITIZING ALERTS

FIELD

The disclosed technology relates to systems and methods for prioritizing alerts. In particular, the disclosed technology relates to automatically labeling recognized alerts.

BACKGROUND

Accurately and timely labeling alerts generated from software programs and systems is vastly important. Some alerts may signal that a system or software is down. For critical software, this could mean high business impact is affected and may prevent work from being conducted or other severe issues leading to potential liability. Thus, it is important that, of the thousands of alerts received by an organization, the important alerts are flagged immediately and directed to the right information technology (IT) users.

Accordingly, there is a need for improving the accuracy and speed of alert labeling for an organization. Embodiments of the present disclosure are directed to this and other considerations.

SUMMARY

Disclosed embodiments may include a system for prioritizing alerts. The system for prioritizing alerts may include one or more processors and memory in communication with the one or more processors and that may store instructions that are configured to cause the system to perform a method for prioritizing alerts. For example, the system may receive a first alert from a first application, transmit a first prompt to rate the first alert to one or more user devices associated with one or more users, receive a first rating label for the first alert, and train a machine learning model to associate the first rating label with the first alert. The system may receive a second alert from the first application, determine, using the machine learning model, whether the second alert is similar to the first alert based on a predetermined similarity threshold. Based on the second alert satisfying the predetermined similarity threshold, the system may associate the first rating label with the second alert and transmit the second alert with the first rating label to the one or more user devices for display. Based on the second alert failing to satisfy the predetermined similarity threshold, the system may transmit the second alert to the one or more user devices with a second prompt to rate the second alert, receive a second rating label for the second alert, train the machine learning model to associate the second rating label with the second alert, and transmit the second alert with the second rating label to the one or more user devices for display.

Disclosed embodiments may include another system for prioritizing alerts. The system may include one or more processors and that may store instructions that are configured to cause the system to perform a method for prioritizing alerts. For example, the system may receive a first alert from a first application and determine, using a machine learning model, whether the first alert is similar to a previous alert based on a predetermined similarity threshold. Based on a the first alert satisfying the predetermined similarity threshold, the system may associate a previous rating label with the first alert, the previous rating label being associated with the previous alert and transmit the first alert with the previous rating label to one or more user devices for display. Based on the first alert failing to satisfy the predetermined similarity threshold, the system may transmit the first alert with a first prompt to rate the first alert to the one or more user devices, receive a first rating label for the first alert, train the machine learning model to associate the first rating label with the first alert, and transmit the first alert with the first rating label to the one or more user devices for display.

Disclosed embodiments may include another system for prioritizing alerts. The alert prioritization system may include one or more processors and that may store instructions that are configured to cause the system to perform a method for prioritizing alerts. For example, the system may receive a first alert from a first application and determine, using a machine learning model, whether the first alert is similar to a previous alert based on a predetermined similarity threshold. Based on the first alert satisfying the predetermined similarity threshold, associate a previous rating label with the first alert, the previous rating label being associated with the previous alert and transmit the first alert with the previous rating label to one or more user devices for display.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate generally to labeling text documents, more particularly, to systems and methods for automatically applying prioritization labels to alerts based on their similarity to previous alerts. The systems and methods described herein are necessarily rooted in computer technology as they relate to labeling alerts generated from software applications by using a machine learning model. Machine learning models are a unique computer technology that involves training the models to complete a task, such as classification or labeling by feeding the models with labeled or classified text documents (training documents) so they learn how to label the training documents and apply the same labeling techniques to unlabeled alerts. Importantly, examples of the present disclosure improve the speed and accuracy with which computers can label alerts by constantly training the machine learning model based on user or power user feedback on alert labeling. Additionally, the systems and methods described herein reduce the time it takes to understand an alert and associated actions based on previous ratings. This in turn helps reduce the mean time to restore (MTTR) of future alerts.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
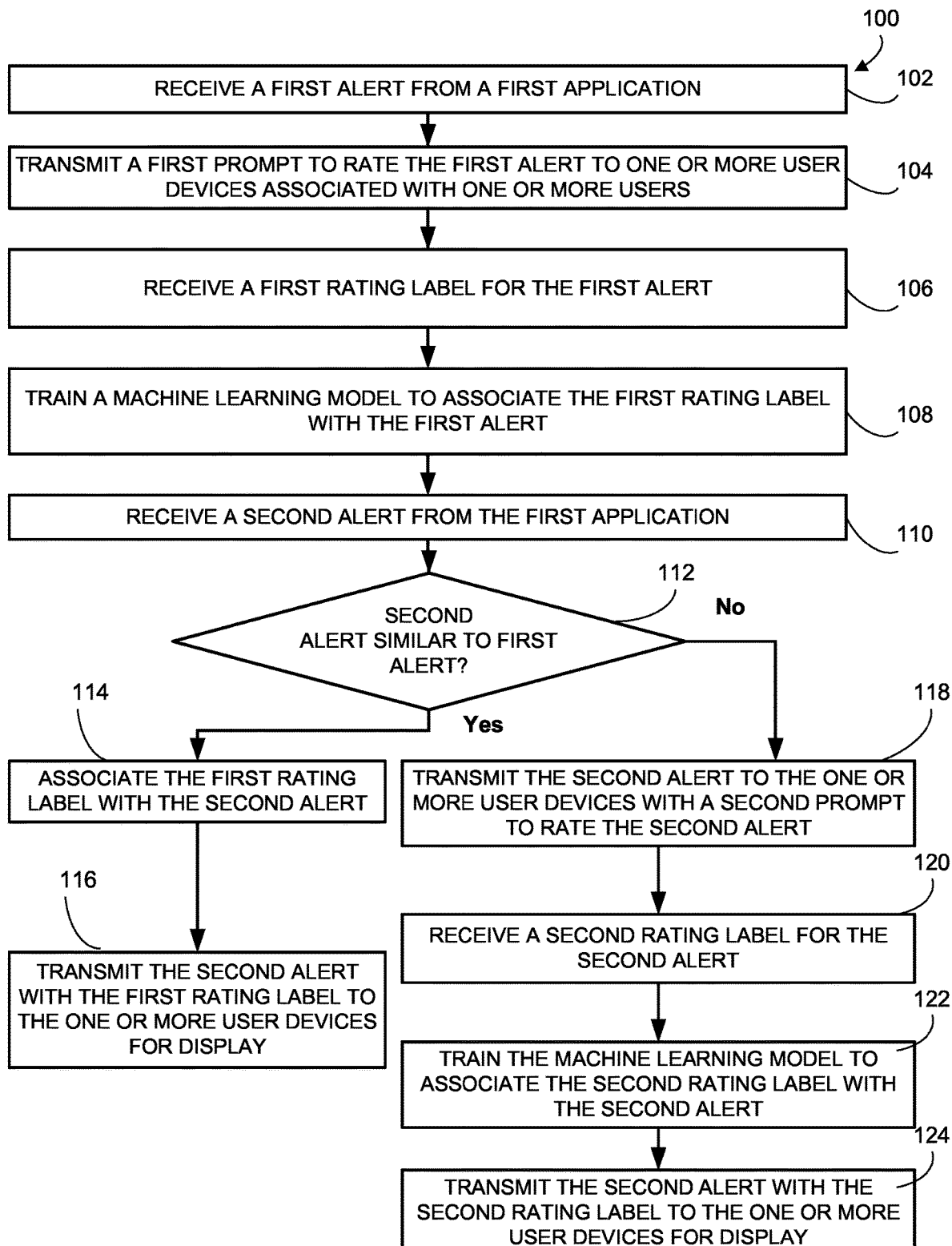
FIG. 1 is a flow diagram illustrating an exemplary method for prioritizing alerts, in accordance with certain embodiments of the disclosed technology.

FIG. 1 a flow diagram illustrating an exemplary method for prioritizing alerts, in accordance with certain embodiments of the disclosed technology. The steps of method 100 may be performed by one or more components of the system 500 (e.g., alert labeling system 420 of alert management system 508 or user device 502), as described in more detail with respect to FIGS. 4 and 5. However, for ease of reference and brevity, the steps of method 100 will be described below as being performed by the alert labeling system 420.

In block 102, the alert labeling system 420 may receive a first alert from a first application. Various monitoring systems monitor applications' health for any issue and generates notifications via alerting system, which is received as an alert to alert labeling system 420. Alerts may have the following fields: title, monitoring system, monitoring system integration key, line of business application configuration item. For example, one such alert may have the following format:
Alert Title:
Average CPUUtilization LessThanOrEqualToThreshold 30.0 for ServiceName
prod_application_servicename
Monitoring System:
CloudWatch
Monitoring System Integration Key:
Unique identifier (UID)
Line of Business:
Card/Bank/etc.
Application Configuration Item:
APP_CI In block 104, the alert labeling system 420 may transmit a first prompt to rate the first alert to one or more user devices associated with one or more users. The first prompt may include a request to assign a rating label of 1, 2, or 3. The request may include instructions regarding the requirements for each rating. For example, a rating label of 1 may mean that the alert is immediately actionable, a rating of 2 may mean that the alert is descriptive and contains details (e.g., application name, criticality associated with the alert (e.g., warning or critical), summarization of the impact, system name being monitors) about the application and/or system that sent the alert, and a rating of 3 may mean that after actions associated with the alert are already documented and clear. In some embodiments, if the alert meets the criteria of rating 1 and 3, the user may rate the alert as a 2. A rating higher than 1 also implies the alert is actionable. A rating of 3 implies all criteria for the alert is met. Non-actionable alerts may be rated 1 regardless of alert detail.

The request may also include instructions to apply special labels if applicable. For example the request may include instructions to apply a quarantine label to indicate that the first alert needs to be quarantined for immediate or future analysis. This may apply when the contents of the alert may no longer be accurate and the alert needs to be reviewed by a user. The special labels may include a remove quarantine status label to instruct the alert labeling system 420 to not automatically apply the quarantine status label to similar alerts in the future. The special labels may include a high severity status label to indicate that the alert is associated with a high severity incident. The special labels may include a remove high severity status to instruct the alert labeling system 420 to not apply the high severity status label to similar alerts in the future. The special labels may include a probationary status label that designates all future alerts coming from a system and/or application as probationary. In some embodiments, only high level users or power users can apply one or more of these special labels where as a low level user cannot.

In block 106, the alert labeling system 420 may receive a first rating label for the first alert. The first rating label may include more than one label. In some embodiments, the first rating label may include one or more special labels, but at a minimum includes a numerical rating label. In one example, the alert labeling system 420 may receive a rating label of 2 from the user device 502.

In block 108, the alert labeling system 420 may train a machine learning model to associate the first rating label with the first alert. The alert labeling system 420 may feed the machine learning model with alerts and associated labels in real time or near real time (as they are applied by the user so that the machine learning model learns to associate a particular alert with a particular label. In some embodiments, the alert labeling system 420 provides the machine learning model with a corpus of alerts and associated labels in order to train the machine learning model.

In block 110, the alert labeling system 420 may receive a second alert from the first application. In some embodiments, the alert labeling system 420 may receive alerts from more than one application and from different applications. In other embodiments, the alert labeling system 420 may receive alerts from the same application, but from different groups or departments or systems within an organization.

In block 112, the alert labeling system 420 may determine, using the machine learning model, whether the second alert is similar to the first alert. The determination of whether the second alert is similar to the first alert may be based on a comparison of the second alert to the first alert to determine if the second alert satisfies a predetermined similarity threshold. When the alert labeling system 420 determines that the second alert is similar to the first alert, the alert labeling system 420 may proceed to block 114. When the alert labeling system 420 determines that the second alert is not similar to the first alert, the alert labeling system 420 may proceed to block 118.

In block 114, the alert labeling system 420 may associate the first rating label with the second alert. For example, if the first rating label includes the rating label 2, then the alert labeling system 420 may label the second alert with a rating label of 2. If the first rating label included a rating label 2 and a quarantine label, then the alert labeling system 420 may apply a rating label of 2 and a quarantine label to the second alert.

In block 116, the alert labeling system 420 may transmit the second alert with the first rating label to the one or more user devices for display. For example, the alert labeling system 420 may transmit a second alert with the first rating label to user device 502.

In block 118, the alert labeling system 420 may transmit the second alert to the one or more user devices 502 with a second prompt to rate the second alert. The one or more user devices 502 may display the second alert and the second prompt for associated users to rate the second alert. For example, the user device 502 may display a notification informing the user that the user device 502 has receive the second prompt to rate the second alert. The prompt may invite a user to rate the second alert as a 1, 2, or 3 or other ratings as described above via a graphical user interface.

In block 120, the alert labeling system 420 may receive a second rating label for the second alert. For example, a user associated with a user device 502 may enter a rating of 2 for the second alert into a graphical user interface displayed on the user device 502. Based on this user input, the user device 502 may transmit the rating of 2 to the alert labeling system via network 506 and/or local network 512.

In block 122, the alert labeling system 420 may train the machine learning model to associate the second rating label with the second alert. This may include supervised or unsupervised training.

In block 124, the alert labeling system 420 may transmit the second alert with the second rating label to the one or more user devices for display. The alert labeling system 420 may transmit the alert via email, push notification, mobile alerts, text message, a dedicated communication platform (e.g., via a Slack channel), etc. In some embodiments, method 100 may be implemented using a communication platform such as Slack to transmit and receive various alerts and labels. Additionally, the alerts may be generated and/or received in a serverless system such as one provided by Amazon Web Services (AWS).

In some embodiments, the alert labeling system 420 may receive an indication from one or more user devices that that alert was actionable as well as a time period between displaying the alert and acting upon it by a user. With the indication, the alert labeling system 420 may compare the fields of actionable alerts with an actionable time period less than a predetermined threshold and extract the field descriptors to generate an alert standard (e.g., field requirements such as a title, a monitoring description, a monitoring system integration key, a line of business, and an application configuration item for an alert). This alert standard may be updated dynamically over time and may be sent to alert generating/monitoring systems and teams of users to mirror. In some embodiments, the alerts that are actionable and acted upon quickly (e.g., within the predetermined threshold time period) are fed into a machine learning model trained to generate alert standards from these actionable alerts. The alert labeling system 420, using the machine learning model, may generate the alert standard which may be sent to the monitoring and alert generating systems and applications and users that maintain those systems.

Figure 2:
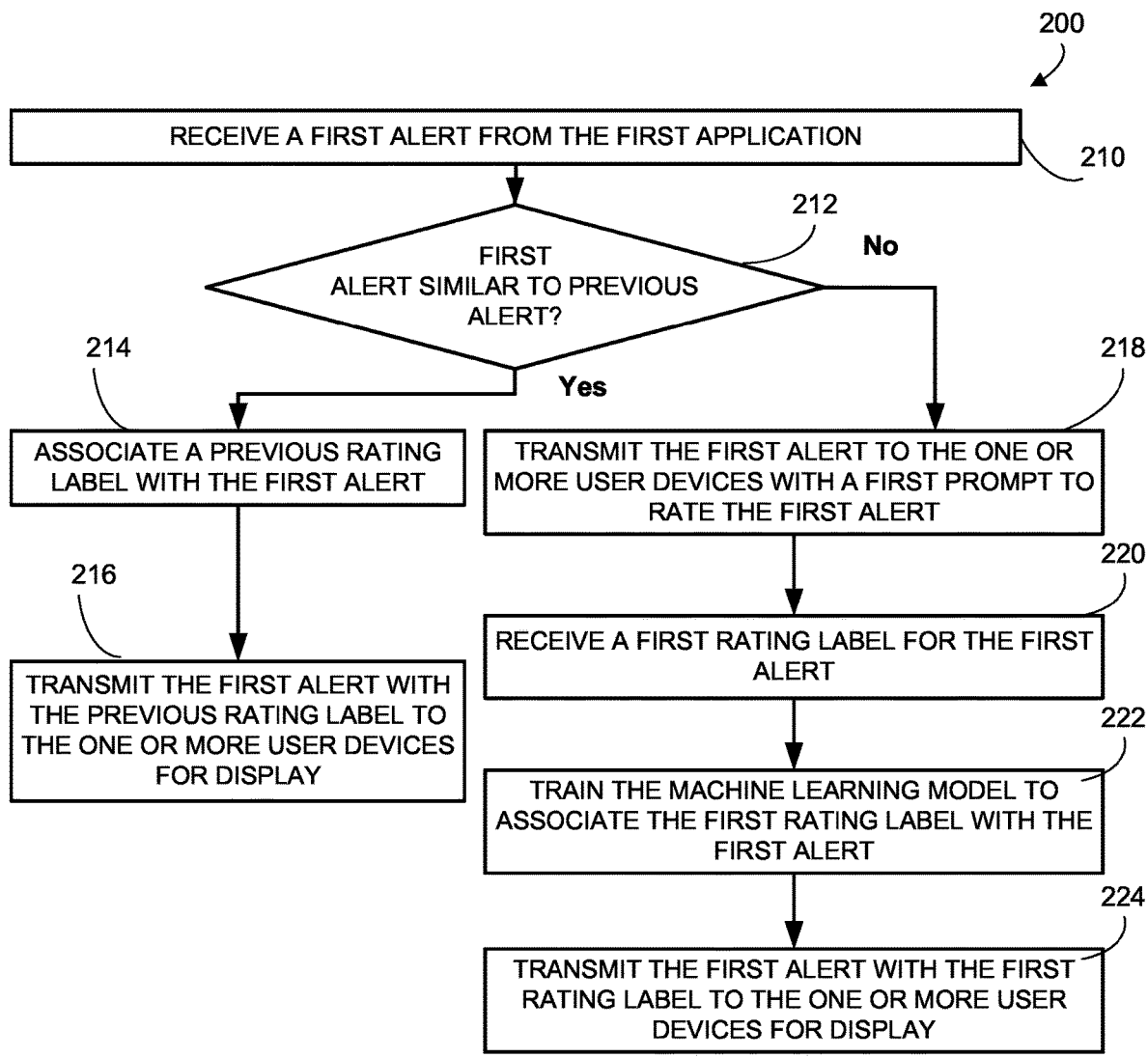
FIG. 2 is a flow diagram illustrating an exemplary method for prioritizing alerts, in accordance with certain embodiments of the disclosed technology.

FIG. 2 is a flow diagram illustrating an exemplary method for prioritizing alerts, in accordance with certain embodiments of the disclosed technology. The steps of method 200 may be performed by one or more components of the system 500 (e.g., alert labeling system 420 of alert management system 508 or user device 502), as described in more detail with respect to FIGS. 4 and 5. However, for ease of reference and brevity, the steps of method 100 will be described below as being performed by the alert labeling system 420.

Method 200 of FIG. 2 is similar to method 100 of FIG. 1, except that method 200 may not include blocks similar to blocks 102, 104, 106, and 108 of method 100. The descriptions of blocks 210, 212, 214, 216, 218, 220, 222, and 224 in method 200 are similar to the respective descriptions of blocks 110, 112, 114, 116, 118, 120, 122, and 124 of method 100 and are not repeated herein for brevity.

Figure 3:
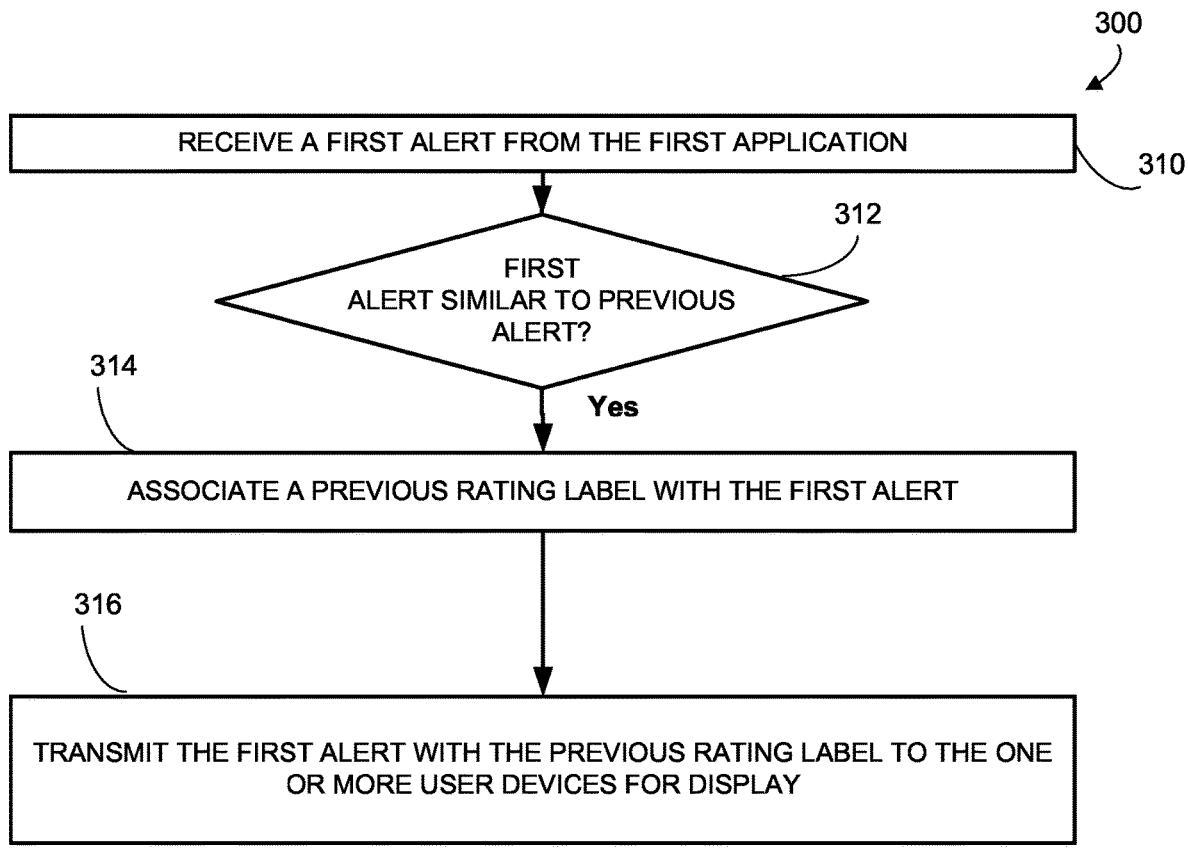
FIG. 3 is a flow diagram illustrating an exemplary method for prioritizing alerts, in accordance with certain embodiments of the disclosed technology.

FIG. 3 is a flow diagram illustrating an exemplary method for prioritizing alerts, in accordance with certain embodiments of the disclosed technology. The steps of method 300 may be performed by one or more components of the system 500 (e.g., alert labeling system 420 of alert management system 508 or user device 502), as described in more detail with respect to FIGS. 4 and 5. However, for ease of reference and brevity, the steps of method 100 will be described below as being performed by the alert labeling system 420.

Method 300 of FIG. 2 is similar to method 100 of FIG. 1, except that method 300 may not include blocks similar to blocks 102, 104, 106, 108, 118, 120, 122, and 124 of method 100. The descriptions of blocks 310, 312, 314, and 316 in method 300 are similar to the respective descriptions of blocks 110, 112, 114, and 116 of method 100 and are not repeated herein for brevity.

Figure 4:
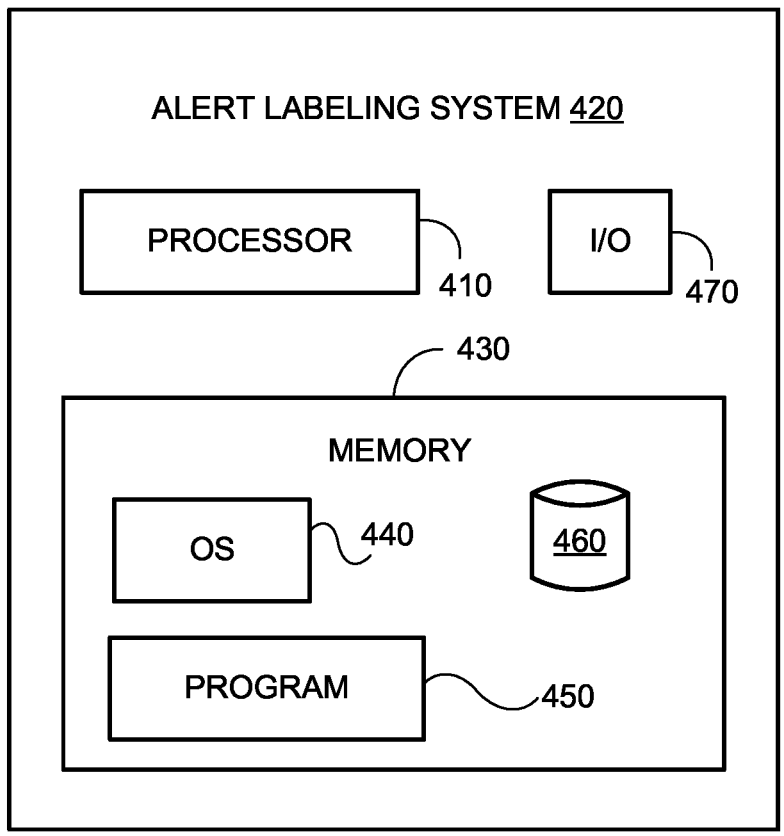
FIG. 4 is a block diagram of an example document classification system used to label alerts, according to an example implementation of the disclosed technology.
Figure 5:
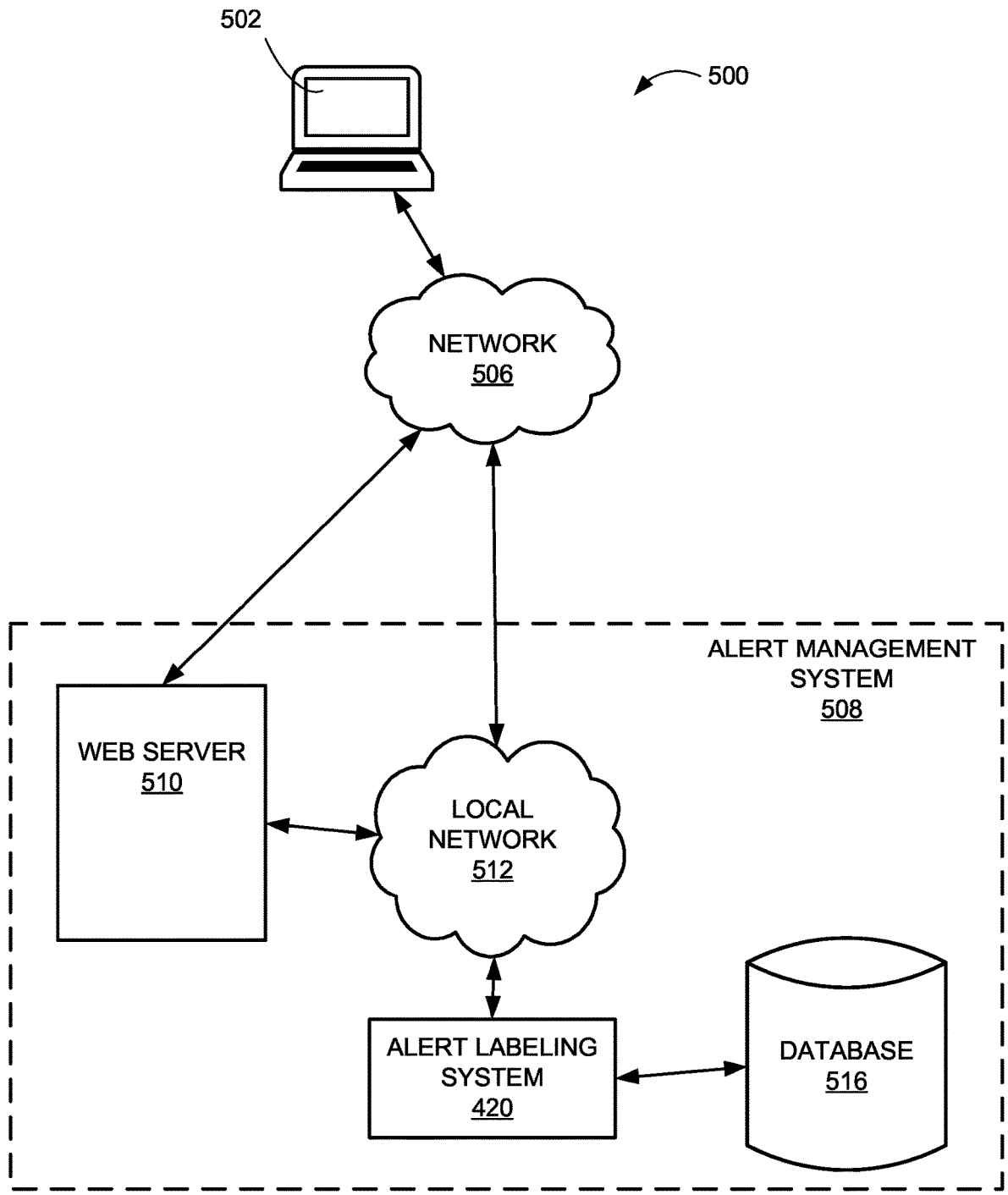
FIG. 5 is a block diagram of an example system that may be used to label alerts, according to an example implementation of the disclosed technology.

FIG. 4 is a block diagram of an example alert labeling system 420 used to label alerts, according to an example implementation of the disclosed technology. According to some embodiments, the user device 502 and alert labeling system 420, as depicted in FIG. 5 and described below, may have a similar structure and components that are similar to those described with respect to alert labeling system 420 shown in FIG. 4. As shown, the alert labeling system 420 may include a processor 410, an input/output ("I/O") device 470, a memory 430 containing an operating system ("OS") 440 and a program 450. In certain example implementations, the alert labeling system 420 may be a single server or may be configured as a distributed computer system including multiple servers or computers that interoperate to perform one or more of the processes and functionalities associated with the disclosed embodiments. In some embodiments, the alert labeling system 420 may further include a peripheral interface, a transceiver, a mobile network interface in communication with the processor 410, a bus configured to facilitate communication between the various components of the alert labeling system 420, and a power source configured to power one or more components of the alert labeling system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 410 may constitute a single core or multiple core processor that executes parallel processes simultaneously. For example, the processor 410 may be a single core processor that is configured with virtual processing technologies. In certain embodiments, the processor 410 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the alert labeling system 420 may include one or more storage devices configured to store information used by the processor 410 (or other components) to perform certain functions related to the disclosed embodiments. In one example, the alert labeling system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the alert labeling system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the alert labeling system 420 may include the memory 430 that may include one or more programs 450 to perform one or more functions of the disclosed embodiments. For example, in some embodiments, the alert labeling system 420 may additionally manage dialogue and/or other interactions with the customer via a program 450.

The processor 410 may execute one or more programs located remotely from the document classification system 420. For example, the alert labeling system 420 may access one or more remote programs that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a alert labeling database 460 for storing related data to enable the alert labeling system 420 to perform one or more of the processes and functionalities associated with the disclosed embodiments.

The alert labeling database 460 may include stored data relating to previously associations between labels and alerts. According to some embodiments, the functions provided by the alert labeling database 460 may also be provided by a database that is external to the alert labeling system 420, such as the database 516 as shown in FIG. 5.

The alert labeling system 420 may also be communicatively connected to one or more memory devices (e.g., databases) locally or through a network. The remote memory devices may be configured to store information and may be accessed and/or managed by alert labeling system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The alert labeling system 420 may also include one or more I/O devices 470 that may comprise one or more interfaces for receiving signals or input from devices and providing signals or output to one or more devices that allow data to be received and/or transmitted by the alert labeling system 420. For example, the alert labeling system 420 may include interface components, which may provide interfaces to one or more input devices, such as one or more keyboards, mouse devices, touch screens, track pads, trackballs, scroll wheels, digital cameras, microphones, sensors, and the like, that enable the alert labeling system 420 to receive data from a user (such as, for example, via the user device 502).

In example embodiments of the disclosed technology, the alert labeling system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the alert labeling system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the alert labeling system 420 may include a greater or lesser number of components than those illustrated.

FIG. 5 is a block diagram of an example system that may be used for labeling alerts, according to an example implementation of the disclosed technology. The components and arrangements shown in FIG. 5 are not intended to limit the disclosed embodiments as the components used to implement the disclosed processes and features may vary. As shown, alert management system 508 may interact with a user device 502 via a network 506. In certain example implementations, the alert management system 508 may include a local network 512, an alert labeling system 420, and a database 516.

In some embodiments, a user may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 406 and ultimately communicating with one or more components of the alert management system 508. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the natural language processing system 408. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

The alert management system 508 may be associated with and optionally controlled by one or more entities such as a business, corporation, individual, partnership, or any other entity that provides one or more of goods, services, and consultations to individuals such as customers. The alert management system 508 may include one or more servers and computer systems for performing one or more functions associated with products and/or services that the organization provides.

The alert management system 508 may include web server 510, which may interact with network 506 and local network 512. The local network 512 may include any type of computer networking arrangement used to exchange data in a localized area, such as WiFi, Bluetooth™ Ethernet, and other suitable network connections that enable components of the alert management system 508 to interact with one another and to connect to the network 506 for interacting with components in the system 500 environment. In some embodiments, the local network 512 may include an interface for communicating with or linking to the network 506. In other embodiments, certain components of the alert management system 508 may communicate via the network 506, without a separate local network 506.

In accordance with certain example implementations of the disclosed technology, the alert management system 508 may include one or more computer systems configured to compile data from a plurality of sources the alert labeling system 420 and/or the database 516. The alert labeling system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to alerts associated with various applications used by the organization. The database 516 may also serve as a back-up storage device and may contain data and information that is also stored on, for example, database 460, as discussed with reference to FIG. 4.

Figure 6:
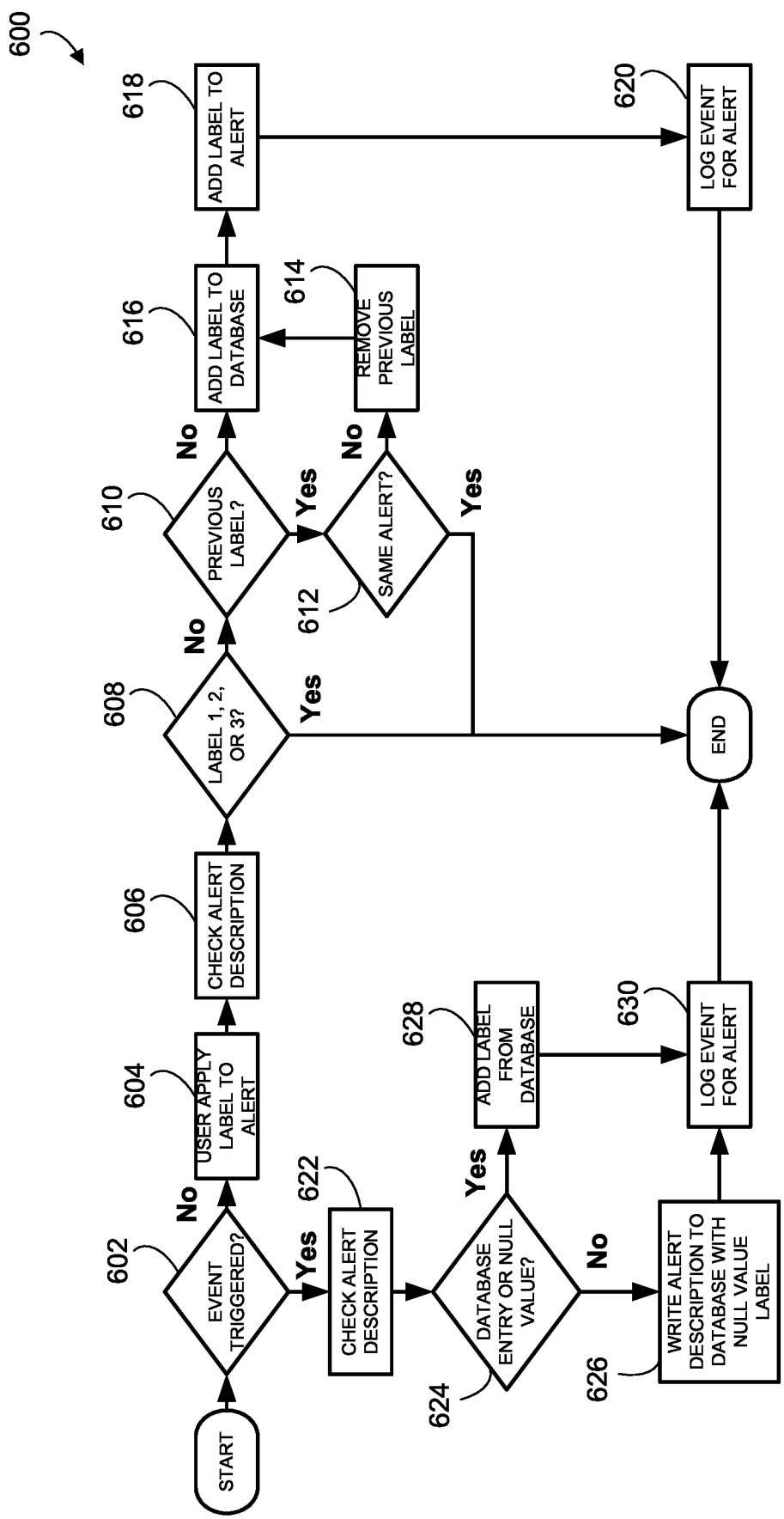
FIG. 6 is a flow diagram illustrating an exemplary method for prioritizing alerts, in accordance with certain embodiments of the disclosed technology.

FIG. 6 is a flow diagram illustrating an exemplary method for prioritizing alerts, in accordance with certain embodiments of the disclosed technology. The steps of method 600 may be performed by one or more components of the system 500 (e.g., alert labeling system 420 of alert management system 508 or user device 502), as described in more detail with respect to FIGS. 4 and 5. However, for ease of reference and brevity, the steps of method 100 will be described below as being performed by the alert labeling system 420.

Method 600 starts when an event-driven serverless computing platform (e.g., an AWS Lambda) is activated. In step 602, the alert labeling system 420 determines whether an event or alert (e.g., a PagerDuty alert) is triggered. When the alert labeling system 420 determines that an event is not triggered, the alert labeling system 420 may proceed to block 604. When the alert labeling system 420 determines that an event is triggered, the alert labeling system 420 may proceed to block 622. In block 604, the alert labeling system 420 may prompt a user to apply a label to an alert and receive a label for an alert. In block 606, the alert labeling system 420 may check an alert description from a database (e.g., by reading AWS DynomoDB). In block 608, the alert labeling system 420 may determine whether the applied label is a rating of 1, 2, or 3. When the alert labeling system 420 determines that the applied label is a rating of 1, 2, or 3, then the process ends. When the alert labeling system 420 determines that the applied label is not a rating of 1, 2, or 3, the alert labeling system 420 may move to block 610. In block 610, the alert labeling system 420 may determine whether the alert had a previous associated label. When the alert labeling system 420 determines that the alert had a previous associated label, the alert labeling system 420 may move to block 612. When the alert labeling system 420 determines that the alert did not have a previous associated label, the alert labeling system 420 may move to block 616. In block 612, the alert labeling system 420 may determine whether the alert is the same as an alert associated with the previous label. When the alert labeling system 420 determines that the alert is the same as an alert associated with the previous label, the alert labeling system 420 ends its process. When the alert labeling system 420 determines that the alert is not the same as an alert associated with the previous label, the alert labeling system 420 removes the previous label in block 614. In block 616, the alert labeling system 420 adds the user applied label to the database to the database. In block 618, the alert labeling system may add the user applied label to the alert. In block 620, the alert labeling system 420 may log an event (e.g., in Spark) for the alert. In block 622, the alert labeling system 420 may check the alert description (e.g., by reading AWS DynomoDB). In block 624, the alert labeling system 420 may determine whether the event has a database entry or a null value for a label. When the alert labeling system 420 determines that the event has a database entry or a null value, the alert labeling system 420 may move to block 628. When the alert labeling system 420 determines that the event does not have a database entry or a null value, the alert labeling system 420 may move to block 626. In block 626, the alert labeling system 420 may write the alert description to the database with the null value label. In block 628, the alert labeling system 628 may add a label from the database to the alert. In block 630, the alert labeling system may log the event (e.g., in Splunk) for the alert.

Exemplary Use Cases

An alert labeling system 420 may be used to associate or apply labels to alerts generated from one or more applications used in an organization that are similar to previous alerts. The alert labeling system 420 may receive a first alert from a first application. The alert labeling system 420 may transmit a first prompt to rate the first alert to one or more user devices (e.g., user device 502) associated with one or more users. In response to receiving the first prompt on their user device 502, the associated user may review the first alert, determine whether one or more labels (e.g., rating of 1, rating of 2, rating of 3, quarantine, high severity, probation). The alert labeling system 420 may receive a first rating label (e.g., a rating of 2) for the first alert from the user device 502. The alert labeling system 420 may train a machine learning model to associate the first rating label (e.g., a rating of 2) with the first alert. The alert labeling system 420 may receive a second alert form the first application. The alert labeling system 420 may determine, using the machine learning model, whether the second alert is similar to the first alert. The determination of whether the second alert is similar to the first alert may be based on whether the second alert satisfies a predetermined similarity threshold. When the alert labeling system 420 determines that the second alert is similar to the first alert, for example, by the second alert being equal to or exceeding the predetermined similarity threshold, the alert labeling system 420 may associate the first rating label (e.g., a rating of 2) with the second alert and transmit the second alert with the first rating label to the one or more user devices for display. When the alert labeling system 420 determines that the second alert is not similar to the first alert, the alert labeling system 420 may transmit the second alert to the one or more user devices (e.g., user device 502) with a second prompt to rate the second alert, train the machine learning model to associate the second rating label with the second alert, and transmit the second alert with the second rating label to the one or more user devices for display. Importantly, the alert labeling system 420 improves the speed and dynamically refines the accuracy with which computers can label alerts by constantly training the machine learning model based on user feedback on alert labeling.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for prioritizing alerts, comprising:
   one or more processors; and
   memory in communication with the one or more processors and storing instructions that are configured to cause the system to:
   receive a first alert from a first application, the first alert comprising one or more fields, the one or more fields comprising at least a title and an identifier;
   transmit a first prompt to rate the first alert to one or more user devices associated with one or more users;
   receive a first rating label for the first alert, the first rating label comprising at least one of at least three options;
   train a machine learning model to associate the first rating label with the first alert;
   generate alert standards using the machine learning model from the one or more fields and the first rating label, the alert standards comprising field requirements;
   receive a second alert from the first application;
   determine, using the machine learning model, whether the second alert is similar to the first alert based on a predetermined similarity threshold;
   based on the second alert satisfying the predetermined similarity threshold:
   associate the first rating label with the second alert; and
   transmit the second alert with the first rating label to the one or more user devices for display; and
   based on the second alert failing to satisfy the predetermined similarity threshold:
   transmit the second alert to the one or more user devices with a second prompt to rate the second alert;
   receive a second rating label for the second alert;
   train the machine learning model to associate the second rating label with the second alert; and
   transmit the second alert with the second rating label to the one or more user devices for display; and
   dynamically update the alert standards; and
   transmit the updated alert standards to the one or more user devices.

2. The system of claim 1, wherein:
   the first alert and the second alert relate to incident management, and
   generating the alert standards further comprises:
   extracting field descriptors of the one or more fields, and
   comparing the one or more fields of the first alert to an actionable time period,
   wherein the actionable time period is less than a predetermined threshold, and
   the machine learning model is trained using one or more alerts acted upon within the actionable time period.

3. The system of claim 1, wherein the instructions, when executed by the one or more processors, are further configured to:
   transmit, based on the second alert failing to satisfy the predetermined similarity threshold, the second alert and the second prompt to the one or more user devices for display.

4. The system of claim 1, wherein the instructions, when executed by the one or more processors, are further configured to cause the system to receive a special label, wherein the special label indicates that immediate action is required.

5. The system of claim 4, wherein the instructions when executed by the one or more processors are further configured to:
   cause, based on the second alert satisfying the predetermined similarity threshold, the system to associate the second alert with a first rating label and the immediate action label; and
   transmit the second alert with the first rating label and the special label to the one or more user devices for display.

6. The system of claim 1, wherein:
   a first option of the at least three options for the first rating label indicates an alert is immediately actionable,
   a second option of the at least three options for the first rating label indicates an alert is descriptive, and
   a third option of the at least three options for the first rating label indicates actions with an alert are already documented.

7. The system of claim 1, wherein
   the first alert comprises a special label,
   the special label is chosen from a group of a quarantine label, a high severity status label, and a probationary status label.

8. The system of claim 1, wherein the instructions, when executed by the one or more processors, are further configured to cause the system to:
   receive, from the one or more user devices, a probation label associated with the first alert;
   receive a third alert;

determine, using the machine learning model, whether the third alert is similar to the first alert based on the predetermined similarity threshold; and based on the third alert satisfying the predetermined similarity threshold:
associate the probation label with the third alert; and
transmit the third alert with the probation label to the one or more user devices for display.

9. The system of claim 8, wherein the instructions, when executed by the one or more processors, are further configured to cause the system to:
based on the third alert not satisfying the predetermined similarity threshold:
transmit the third alert to the one or more user devices with a second prompt to rate the third alert;
receive a fourth rating label for the third alert;
train the machine learning model to associate the third rating label with the third alert; and
transmit the third alert with the fourth rating label to the one or more user devices for display.

10. A system for prioritizing alerts, comprising:
one or more processors; and
memory in communication with the one or more processors and storing instructions that are configured to cause the system to:
receive a first alert from a first application, the first alert comprising one or more fields, the one or more fields comprising at least a title and an identifier;
generate alert standards using a machine learning model from the one or more fields, the alert standards comprising field requirements;
determine, using a machine learning model, whether the first alert is similar to a previous alert based on a predetermined similarity threshold;
based on the first alert satisfying the predetermined similarity threshold:
associate a previous rating label with the first alert, the previous rating label being associated with the previous alert and comprising at least one of at least three options; and
transmit the first alert with the previous rating label to one or more user devices for display; and
based on the first alert failing to satisfy the predetermined similarity threshold:
transmit the first alert with a first prompt to rate the first alert to the one or more user devices;
receive a first rating label for the first alert;
train the machine learning model to associate the first rating label with the first alert; and
transmit the first alert with the first rating label to the one or more user devices for display; and
dynamically update the alert standards over time.

11. The system of claim 10, wherein:
the first alert relates to incident management,
the first alert comprises a special label, and
the special label is chosen from a group of a quarantine label, a high severity status label, and a probationary status label.

12. The system of claim 11, wherein
the special label can only be applied by a power user, and
the one or more fields further comprise monitoring system, line of business, and application configuration item; and
the identifier is a monitoring system integration key.

13. The system of claim 10, wherein instructions, when executed by the one or more processors, are further configured to:

transmit, based on the first alert failing to satisfy the predetermined similarity threshold, the first alert and the first prompt to the one or more user devices for display.

14. The system of claim 10, wherein the instructions when executed by the one or more processors are further configured to cause the system to receive a special label, wherein the special label indicates that immediate action is required.

15. The system of claim 14, wherein the instructions when executed by the one or more processors are further configured to:
cause, based on the first alert satisfying the predetermined similarity threshold, the system to associate the first alert with a first rating label and the special label; and
transmit the first alert with the first rating label and the special label to the one or more user devices for display.

16. The system of claim 10, wherein:
a first option of the at least three options for the first rating label indicates an alert is immediately actionable,
a second option of the at least three options for the first rating label indicates an alert is descriptive, and
a third option of the at least three options for the first rating label indicates actions with an alert are already documented.

17. The system of claim 10, wherein the instructions when executed by the one or more processors are further configured to cause the system to:
receive, from the one or more user devices, a probation label associated with the first alert;
receive a second alert;
determine, using the machine learning model, whether the second alert similar to the first alert based on the predetermined similarity threshold;
based on the second alert satisfying the predetermined similarity threshold;
associate the probation label with the second alert; and
transmit the second alert with the probation label to the one or more user devices for display.

18. An alert prioritization system comprising:
one or more processors; and
memory in communication with the one or more processors and storing instructions that are configured to cause the system to:
receive a first alert from a first application, the first alert comprising one or more fields, the one or more fields comprising at least a title and an identifier;
generate, using a machine learning model, alert standards from the one or more fields, the alert standard comprising field requirements;
determine, using a machine learning model, whether the first alert is similar to a previous alert based on a predetermined similarity threshold; and
based on the first alert satisfying the predetermined similarity threshold;
associate a previous rating label with the first alert, the previous rating label being associated with the previous alert and comprising at least one of at least three options; and
transmit the first alert with the previous rating label to one or more user devices for display; and
dynamically update, via the machine learning model, the alert standards.

19. The system of claim 18, wherein the instructions when executed by the one or more processors are further configured to cause the system to:
based on the first alert failing to satisfy the predetermined similarity threshold:

transmit the first alert to the one or more user devices with a first prompt to rate the first alert;
receive a first rating label for the first alert;
train the machine learning model to associate the first rating label with the first alert; and
transmit the first alert with the first rating label to the one or more user devices for display.

* * * * *